(12) United States Patent
Koopmans et al.

(10) Patent No.: US 6,337,013 B1
(45) Date of Patent: Jan. 8, 2002

(54) REMOVABLE FILTER WITH JACK SEALING DEVICE AND VACUUM CLEANING HEADS

(75) Inventors: Robert Koopmans, Rockwood; Kevin Graydon McCauley, Oakville, both of (CA)

(73) Assignee: Ontario Power Generation, Inc. (CA)

( * ) Notice: Subject to any disclaimer, the term of this patent is extended or adjusted under 35 U.S.C. 154(b) by 0 days.

(21) Appl. No.: 09/337,507

(22) Filed: Jun. 22, 1999

Related U.S. Application Data

(63) Continuation-in-part of application No. 09/219,828, filed on Dec. 23, 1998, now abandoned.
(60) Provisional application No. 60/068,599, filed on Dec. 23, 1997.

(51) Int. Cl.[7] .......................... B01D 25/00; B01D 29/68
(52) U.S. Cl. .................... 210/232; 210/238; 210/323.2; 210/333.01; 210/415; 210/416.1; 210/435; 210/497.01; 210/470; 210/450
(58) Field of Search ................................. 210/108, 402, 210/403, 404, 406–408, 411, 414, 415, 413, 416.1, 435, 450, 232, 499, 497.01, 323.2, 333.01, 339, 335, 453, 455, 320, 394, 410, 326, 327, 373, 347, 238, 391, 396, 470

(56) References Cited

U.S. PATENT DOCUMENTS

| | | | |
|---|---|---|---|
| 2,027,652 A | * | 1/1936 | Raisch |
| 3,554,378 A | * | 1/1971 | Kohl |
| 3,616,914 A | | 11/1971 | Reid |
| 3,747,770 A | * | 7/1973 | Zentis |
| 4,045,345 A | | 8/1977 | Drori |
| 4,156,647 A | | 5/1979 | Nieuwenhuis |
| 4,297,209 A | * | 10/1981 | DeVisser et al. |
| RE31,966 E | | 8/1985 | Sillers, Jr. |
| 4,692,247 A | * | 9/1987 | Orlans |
| 4,863,598 A | | 9/1989 | Drori |
| 4,990,254 A | * | 2/1991 | Toida et al. |
| 5,108,592 A | | 4/1992 | Wilkins et al. |
| 5,141,637 A | | 8/1992 | Reed et al. |
| 5,228,993 A | | 7/1993 | Dori |
| 5,312,544 A | | 5/1994 | Kinney |
| 5,326,470 A | * | 7/1994 | Shaw |
| 5,569,383 A | | 10/1996 | Vander Ark, Jr. et al. |
| 5,614,093 A | | 3/1997 | Mueggenburg et al. |
| 5,632,903 A | * | 5/1997 | Caracciolo, Jr. |

FOREIGN PATENT DOCUMENTS

| | | |
|---|---|---|
| EP | 0 542 678 A1 | 3/1992 |
| WO | WO 95/00230 | 1/1995 |

\* cited by examiner

Primary Examiner—W. L. Walker
Assistant Examiner—David Sorkin
(74) Attorney, Agent, or Firm—Bacon & Thomas, PLLC

(57) ABSTRACT

A filter having filter elements with outwardly flanged ends sealed together. The seal may be secured by use of a rod extending in a lengthwise direction through apertures in the flanged ends. The rod has one end releasably securing the filter element and a second end secured to the housing. A frame can cover the filter elements, and a jack screw in the frame can be used to apply force to the filter elements to secure the seals. The filter may have a cleaning apparatus capable of suctioning material from the filter element.

26 Claims, 11 Drawing Sheets

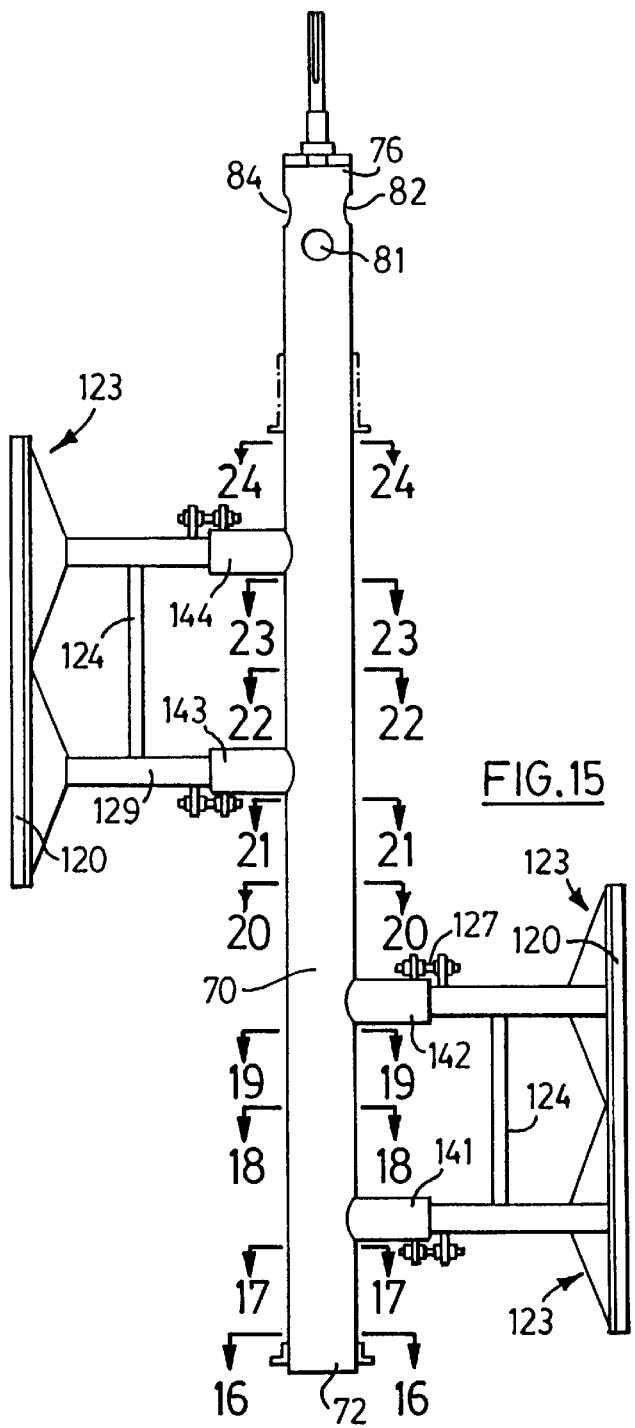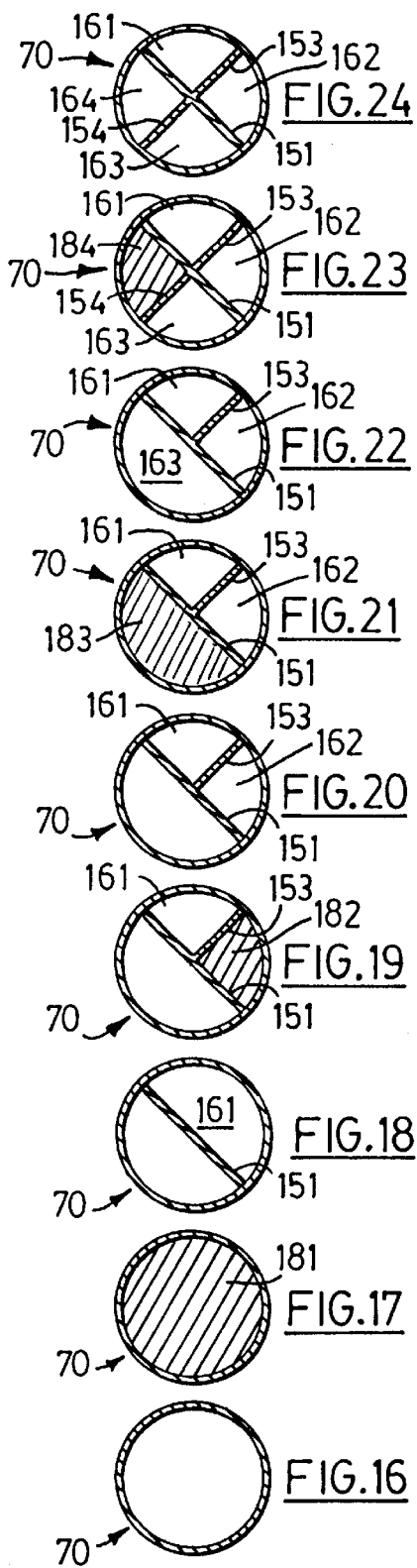

ant matter through the filter elements.
REMOVABLE FILTER WITH JACK SEALING DEVICE AND VACUUM CLEANING HEADS

CROSS REFERENCE TO RELATED APPLICATION

This application is a Continuation-in-Part of U.S. patent application Ser. No. 09/219,828, filed Dec. 23, 1998, which is now abandoned. This application claims priority from U.S. patent application Ser. No. 60/068,599, filed Dec. 23, 1997.

FIELD OF THE INVENTION

This invention relates to improved fluid filter systems, and more particularly to apparatus for releasably sealing filter elements in a filter system and in particular, self-cleaning filter systems.

BACKGROUND OF THE INVENTION

It has been recognized that the use of a plurality of filter elements connected together to accommodate a high flow of fluid is preferable to using a single large filter. Previously, such devices used compressible gaskets, O-rings, or the like in conjunction with male-female fittings or tangs to effect a liquid seal between the tubular filter elements; see, for example, U.S. Pat. No. 5,141,637 to Reed et al. These sealing methods may be suitable for small, low flow filter units which can be coupled and uncoupled by hand. In a large filter unit (for example, one in which the tubular filter elements are too large to be grasped and rotated easily), such a sealing arrangement is unsatisfactory as it is very difficult to break the seal between filter elements when a filter element requires replacement or when the unit is undergoing routine maintenance. Even in the case of a filter unit having only one filter element, the use of compressible gaskets to provide a seal about the filter element within the unit make removal of the filter element quite difficult if the filter element weighs more than one hundred pounds, is vertically oriented, or both.

Prior art filter systems are difficult to service and repair because it is typically not possible to observe the interior of the device without extensive disassembly of it. For large filter units, disassembly and reassembly require relatively long shutdown periods, the efforts of two or more workers and the assistance of additional machinery to lift and move various components. Because prior devices often do not have ways to readily align components during assembly, expensive tubular filter elements can be damaged in the course of maintenance or repair of such devices.

For example, U.S. Pat. No. 4,863,598 to Drori teaches a device for holding a stack of filter disks using externally located rod members which are secured at either end to annuli which secure the disks. However, stacked filter disks may induce a pressure drop of approximately 25 psi (1750 kg/cm²) or more from one side of the filter element to the other, and therefor are not suitable for many applications, such as the high volume filters required by power generating plants. Furthermore, this manner of filter assembly allows material to become trapped between the disks. Consequently, the only effective way to clean these disks is to release the filter elements, separate them, clean them and subsequently reassemble them.

Known methods of self-cleaning a filter element often involve scraping or brushing the filter element. U.S. Pat. No. 5,569,383 to Vander Ark, Jr. et al, PCT patent application number WO95/00230, U.S. Pat. No. 4,156,647 to Nieuwenhuis and U.S. Pat. No. 5,614,093 to Mueggenburg et al. all teach filters which use a rotor with cleaning blades or brushes to scrape clean the pre-filtration side of the filter element. The use of scrapers or brushes for cleaning can damage the filter element either directly or by forcing material through the filter elements.

Other methods of self-cleaning a filter element involve backwashing, i.e. reversing the pressure differential between the pre- and post-filtration sides of the filter element to expel particular matter trapped in the filter element. Typically, such backwashing requires closing the main inlet and outlet valves and opening backwashing valves to reverse the pressure differential (see, for example, U.S. Pat. No. 5,312,544 to Kinney).

U.S. Pat. Nos. 4,045,345 and 5,228,993 to Drori and U.S. Pat. No. 5,108,592 to Wilkins et al. teach filters which use a series of valves and other mechanical devices to automate a backwashing procedure for cleaning the filter element. Cleaning is accomplished by reversing the flow of water through the filter element (i.e. exposing the post-filtration side of the filter element to a high pressure) to expel particulate matter caught in the filter element. In U.S. Pat. No. 4,045,345 Drori teaches the reverse flow is induced by pressure at the outlet of the filter, and particulate matter is expelled through a slotted purging chamber which rotates, along with the filter housing, around the filter element. U.S. Pat. No. 5,228,993 to Drori and U.S. Pat. No. 5,108,592 to Wilkins et al. teach cleaning using a reverse flow through the filter achieved by pressure from a supply pipe. In all of these teachings, particulate matter is expelled from the filter element by spraying the post-filtration side of the filter element through rotating nozzles. The use of spray force for cleaning can damage the filter element either directly or by forcing material through the filter elements. Furthermore, all of these methods of self-cleaning require the cessation and reversal of normal filter flow.

SUMMARY OF THE INVENTION

The present invention addresses these and other problems associated with prior devices by providing a liquid filtration device, comprising a housing having an inlet, an outlet and an inner surface, the housing comprising:

(i) a removable filter element having an inner face, an outer face and first and second flanged ends, each flanged end having a sealing surface and a rod aperture, and the rod apertures of the first and second ends align in a lengthwise direction;

(ii) a housing flange on the housing inner surface, the housing flange being sealable with the first flanged end sealing surface of the filter element;

(iii) a sealing face on the housing inner surface, the sealing face being sealable with the second flanged end sealing surface of the filter element;

(iv) a rod extending in a lengthwise direction through the rod apertures, the rod having a first rod end for releasably securing the filter element and a second rod end secured to the housing; and (v) a fastening device for securing the first rod end, wherein, upon securing the fastening device, sufficient force is applied to the sealing surfaces to define a liquid flowpath through the inlet, through the inner face of the filter element to the outer face of the filter element and out the outlet.

In another preferred embodiment, the filter has a plurality of filter elements connected in series, and each filter element has a first sealing surface sealable with a second sealing surface of an adjacent filter element. The sealing surface may be chamfered. In a further preferred embodiment, the filter element is cylindrical.

The invention also teaches a door on the housing and the filter elements are removable and replaceable through the door. The door may be hinged. In a further preferred embodiment, the filter has removable extensions for extending the length of the rods to the door.

In a preferred embodiment, the filter has a plurality of rod apertures at the first and second flanged ends and a plurality of rods extending therethrough.

Preferably, the flowpath through the filter surface is perpendicular to the inner face. Preferably, the filter element comprises a structural screen and a mesh screen, the structural screen consisting of a rigid or semi-rigid plate having multiple apertures, and the mesh is fixed to the structural screen by a sintering process. Preferably, the mesh screen is the inner face and the structural screen is the outer face. Preferably, the mesh screen has a mesh size of 30 to 40 microns.

In a preferred embodiment the invention also has a pre-screen positioned in the flowpath between the inlet and the filter element, and a pre-screen drain positioned in the flowpath between the pre-screen and the inlet.

In another preferred embodiment, the filter has a housing having an inlet, an outlet and an inner surface, the housing comprising:

(i) a removable filter element having an inner face, an outer face and first and second flanged ends, each flanged end having a sealing surface, the first flanged end having a guide receptacle and the second flanged end having a guide projection;
 (ii) a sealing face on the housing inner surface, the sealing face being sealable with the second flanged end sealing surface of the filter element, and the sealing face having a guide receptacle which receives the guide projection;
 (iii) a housing flange on the housing inner surface, the housing flange having a sealing surface;
 (iv) a frame releasably secured to the housing flange; and
 (v) a jack device located on the frame for applying force to the filter element,
wherein, upon the application of force from the jack device, the sealing surfaces are sealed to define a liquid flowpath through the inlet, through the inner face of the filter element to the outer face of the filter element and out the outlet.

Preferably, this embodiment also has a guide rod extending from the first to the second flanged ends of the filter member. Preferably, the guide rod extends outwardly from the second flanged end to define the guide projection. In another embodiment, the filter also has a position pin and position pin receptacles located in both the first flanged end and the frame, the position pin receptacles for receiving the position pin. In a further related embodiment, the filter also has a support structure frame located between the first flanged end and the frame; a position pin; and position pin receptacles located in both the first flanged end and the support structure frame, the position pin receptacles for receiving the position pin; wherein the jack means applies force to the filter element through applying force to the support structure frame.

In another embodiment, the invention has a runner located on the inner surface for receiving the guide rod.

In another embodiment, the invention teaches a filter having self-cleaning apparatus. In this embodiment, the filter also has a cleaning member for cleaning the inner face of the filter element, the cleaning member having: a cleaning head positioned adjacent the inner face; a discharge aperture extending through the housing; a conduit in flow communication from the cleaning head to the discharge aperture; and a vacuum device for providing suction to the conduit and cleaning head to suction material from the inner face of the filter element, through the conduit and out the discharge aperture. In a preferred embodiment, the filter element is cylindrical and the cleaning member moves rotationally. In a further preferred embodiment, the filter cleaning member further comprises a plurality of cleaning heads in communication with the conduit, the cleaning heads positioned along the cleaning member such that substantially all of the inner face is subjected to vacuum from the cleaning heads when the movement device is operated. Preferably, the cleaning head is a fin nozzle.

In another embodiment, the invention provides a filter with a cleaning member having a plurality of conduits, each conduit in flow communication respectively with one of a plurality of cleaning heads. Preferably, the filter has four cleaning heads and four conduits. Preferably, the conduits are located in a quarter of a hollow shaft quartered lengthwise. In one embodiment, the cleaning heads are arranged in a first and second pair each with a first and second cleaning head, and each first and second cleaning head extend from said shaft in parallel, and the first pair extends from the shaft in a direction opposite the second pair.

In an embodiment, the filter has a plurality of cleaning heads arranged in pairs, each pair having a first and a second cleaning head, and the first cleaning head is structurally secured to the second cleaning head.

In a preferred embodiment, the filter has a deflector plate located between the outlet and the filter element. The deflector plate preferrably has a shape similar to a cross section of the outlet perpendicular to the flowpath through the outlet. The deflector plate preferably has a surface area similar to or larger, for example 1.5 times larger than the cross section of the outlet perpendicular to the flowpath through the outlet.

BRIEF DESCRIPTION OF THE DRAWINGS

FIG. 15 is a side view of an alternate embodiment of the cleaning member of FIG. 10.

FIG. 16 is a cross sectional view of some features taken along line 16—16 of FIG. 15.

FIG. 17 is a cross sectional view of some features taken along line 17—17 of FIG. 15.

FIG. 18 is a cross sectional view of some features taken along line 18—18 of FIG. 15.

FIG. 19 is a cross sectional view of some features taken along line 19—19 of FIG. 15.

FIG. 20 is a cross sectional view of some features taken along line 20—20 of FIG. 15.

FIG. 21 is a cross sectional view of some features taken along line 21—21 of FIG. 15.

FIG. 22 is a cross sectional view of some features taken along line 22—22 of FIG. 15.

FIG. 23 is a cross sectional view of some features taken along line 23—23 of FIG. 15.

FIG. 24 is a cross sectional view of some features taken along line 24—24 of FIG. 15.

DESCRIPTION OF THE PREFERRED EMBODIMENTS

The invention will be described as it applies to a large capacity, high flow rate continuous filter for water. The skilled person will appreciate that the invention has broad application to a variety of liquid filtration situations, and the scope of the invention should not be restricted because of the description of the preferred embodiment which follows.

Figure 1:
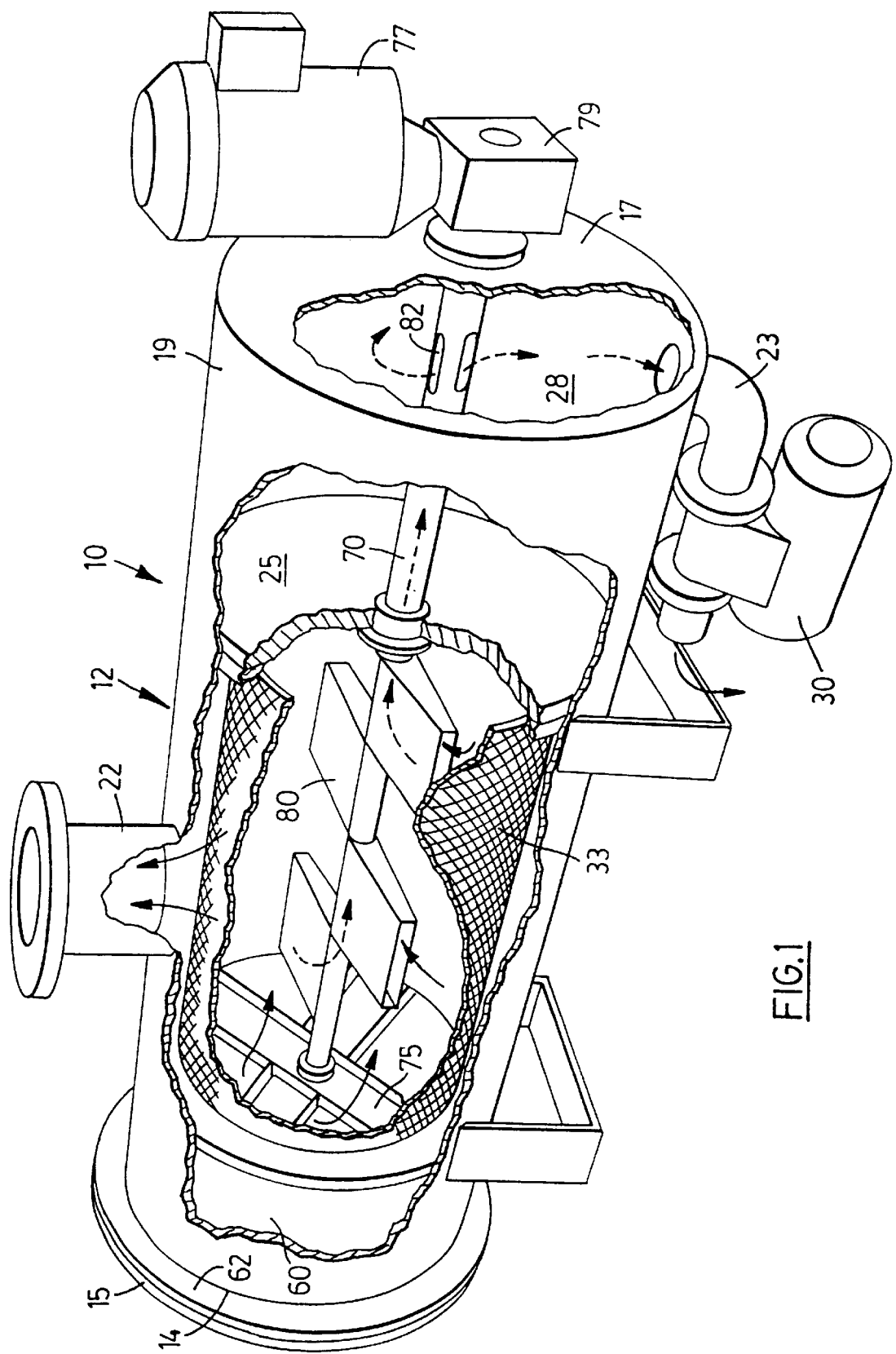
FIG. 1 is a perspective partially broken away view of a preferred embodiment of the invention.
Figure 2:
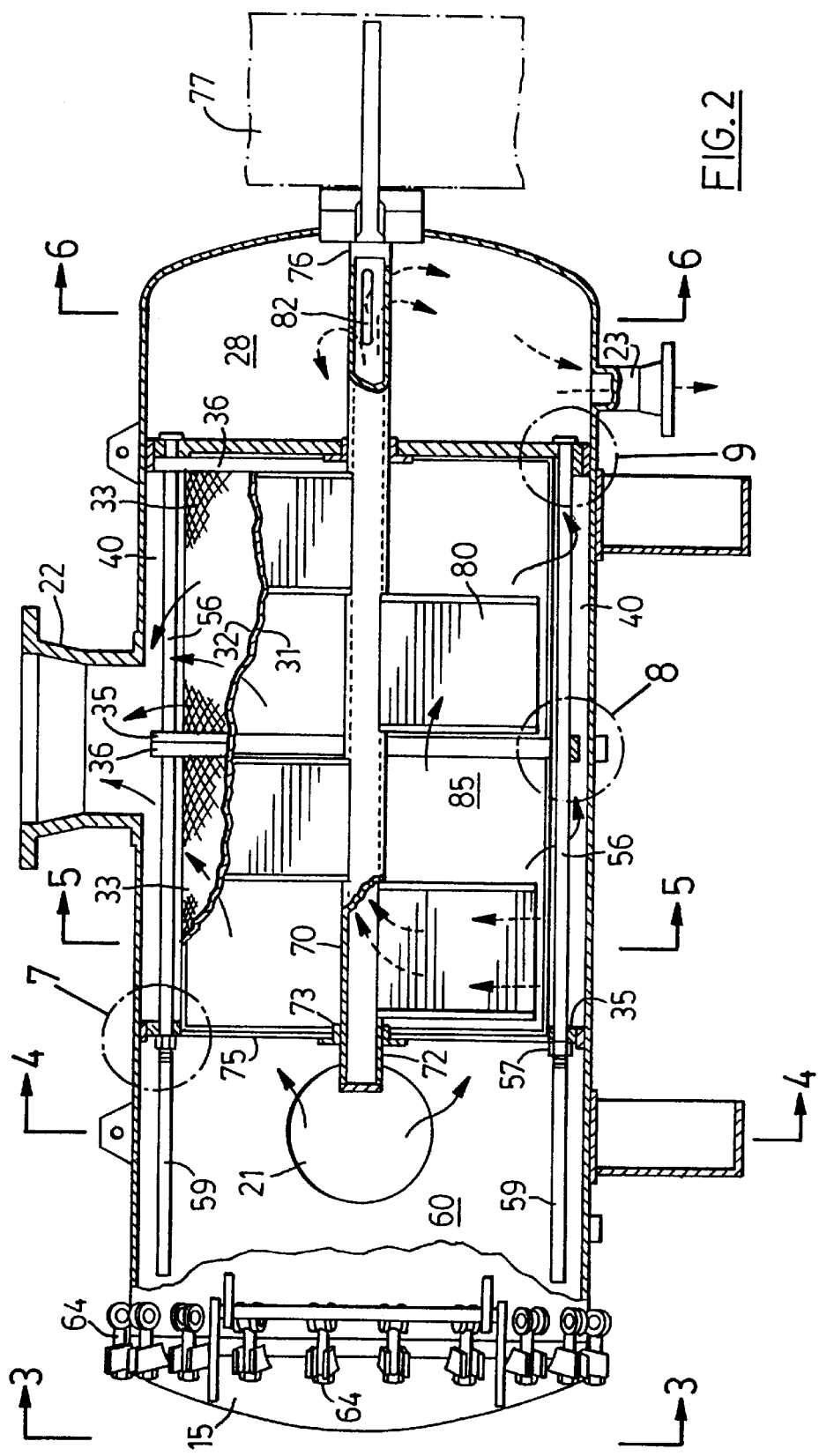
FIG. 2 is a side cross sectional view of the device shown in FIG. 1.
Figure 4:
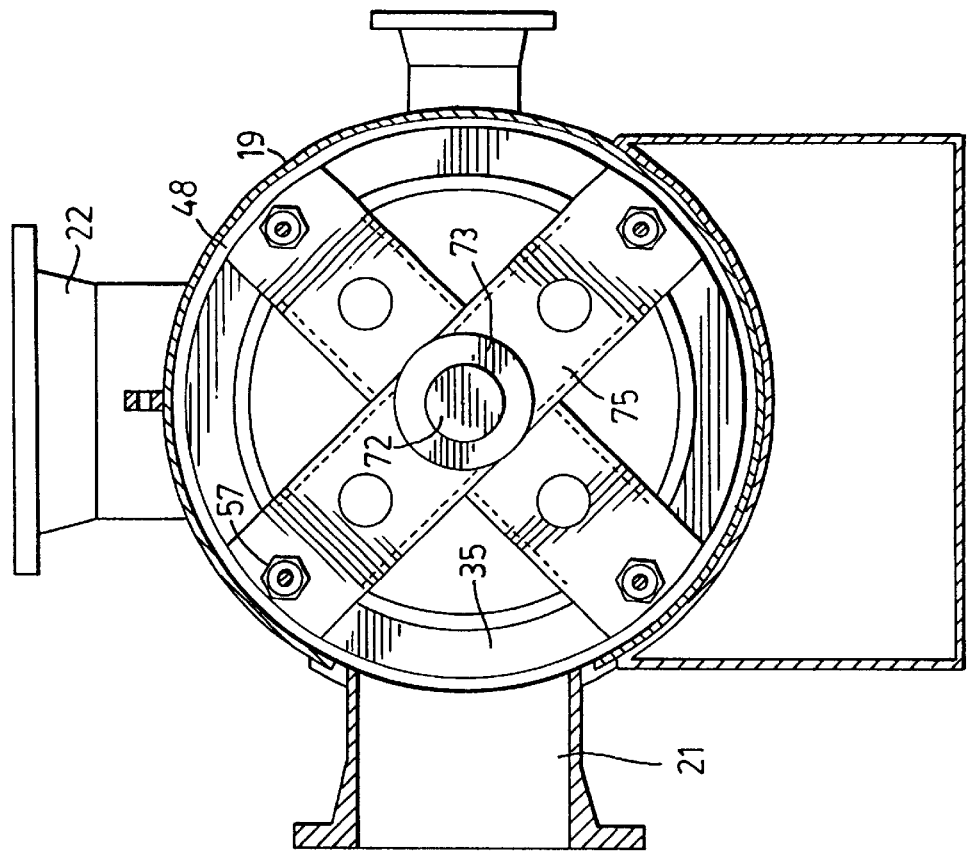
FIG. 4 is a cross sectional view taken along line 4—4 of FIG. 2.

As shown in FIGS. 1 and 2, the liquid filtration device 10 of the invention has a housing 12 which is preferably cylindrical and which has a first end 14 provided with a liquid-tight door 15, and a second end 17. The filtration device 10 may be oriented vertically, horizontally or otherwise. Fluid flow ports are preferably provided through the housing wall 19 of the housing 12. Thus, an inlet 21 is provided near the first end 14 of the housing 12, an outlet 22 for filtered water is provided midway along the length of the housing 12, and a discharge aperture 23 is provided near the second end 17 of the housing 12.

A partition 25 is fixed within the housing 12 and spaced from the second end 17 to thereby define a discharge chamber 28 between the partition 25 and the second end 17. The discharge aperture 23 has a valve 30 which is opened only during the vacuumed cycle of operation. Preferably, the operation of the valve 30 is governed by an electronic controller.

One or more metal filter elements (or filter screens) 33 are positionable within the housing 12. A preferred embodiment will be described as shown in FIG. 2 as having two filter elements 33. One of the advantages of the invention is its capability to be sized with the appropriate number of filter elements 33 to meet the specifications of a particular application. The utilization of a plurality of relatively small filter elements 33 in the device 10 of the invention has a number of decided advantages which will be described.

Each filter element 33 has a panel with an inner face 31 and an outer face 32, and first and second flanged ends 35 and 36 with sealing surfaces formed to provide metal to metal water seals about the filtration zone 40. Filtration zone 40 is defined as the zone between the housing wall 19 and the outer face 32 of filter elements 33. Filtration zone 40 is in flow communication with outlet 22. Pre-filtration zone 85 is defined as the zone within the partition 25 and the inner face 31 of filter elements 33. Pre-filtration zone 85 is in flow communication with inlet 21.

Figure 10:
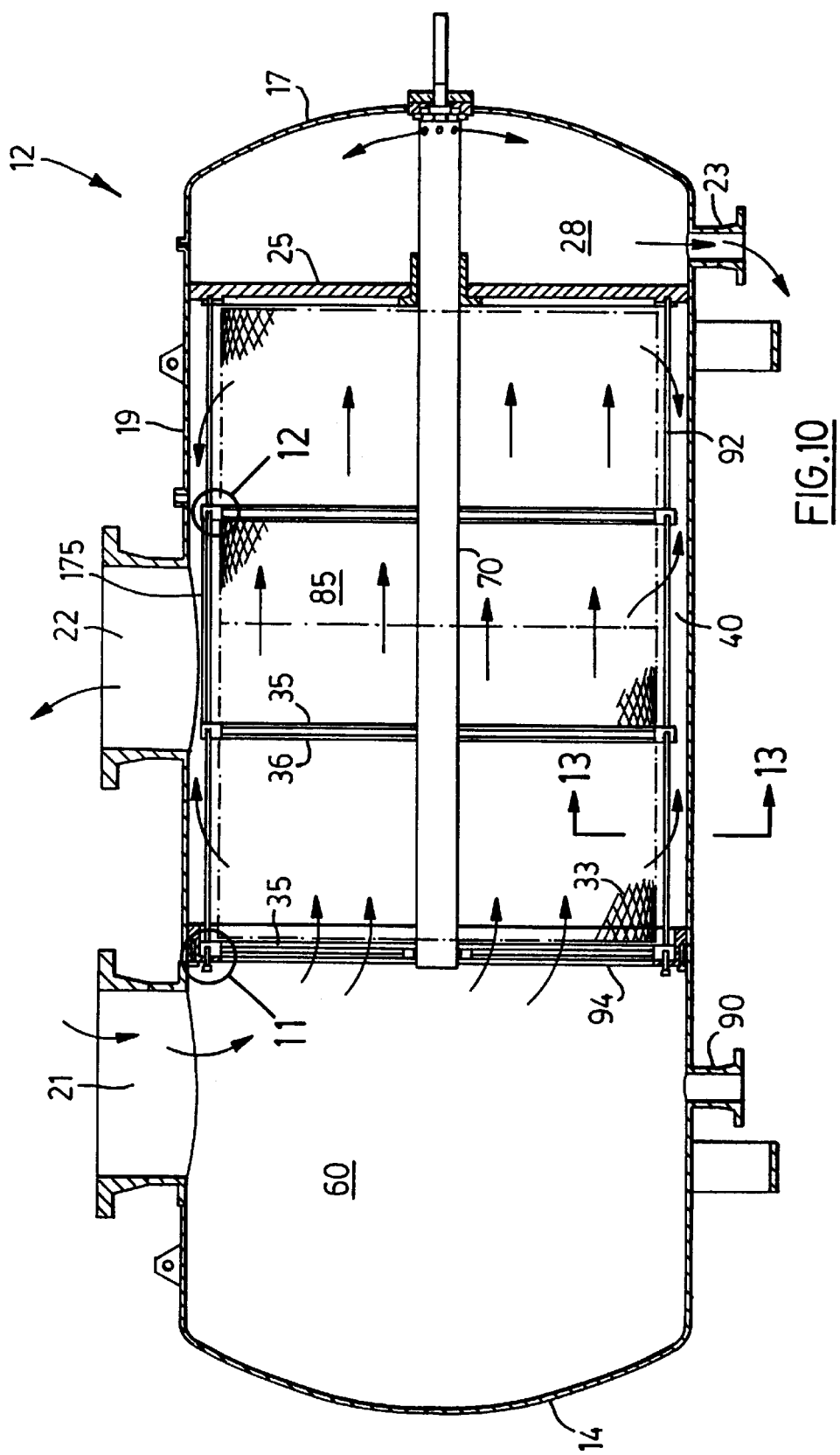
FIG. 10 is a cross sectional view of some features of an alternative embodiment of the device of FIG. 1.
Figure 11:
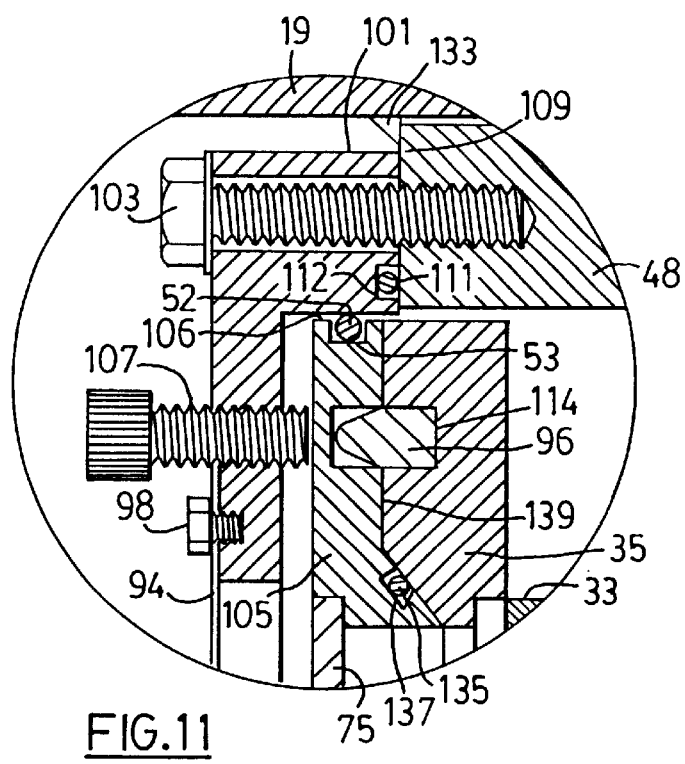
FIG. 11 is a detailed view taken at station 11 of FIG. 10.

As shown in a preferred embodiment in FIGS. 10 and 11, the invention can also comprise a pre-screen 94 located between inlet zone 60 and pre-filtration zone 85. The pre-screen 94 is a filter device with a mesh size greater than that of filter elements 33. Pre-screen 94 is secured to pre-screen frame 101 by a pre-screen bolt 98. Pre-screen 94 functions to prevent larger impurities, for example, seaweed, fish or shells from entering the prefiltration zone 40, where it might obstruct filter elements 33. Generally, objects filtered by pre-screen 94 will be large enough that they will fall to the bottom of inlet zone 60, where they may be periodically purged from the filter housing 12 by opening pre-screen drain 90 to a lower pressure than the pressure in inlet zone 60. In other embodiments, pre-screens may be located in the flow path prior to inlet 21, or, depending on the operating conditions, pre-screens may not be required at all.

Figure 26:
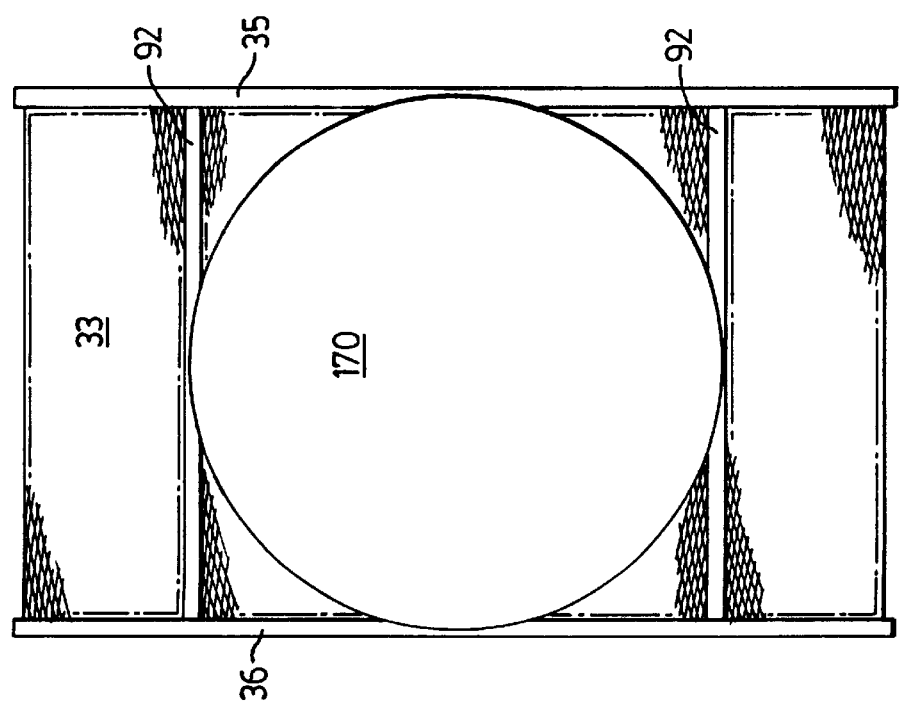
FIG. 26 is a top perspective view of filter elements 33 of FIG. 10.

As shown in a preferred embodiment in perspective views of the filter elements 33 in FIG. 26, the invention can also comprise a deflector plate 170. Deflector plate 170 is located between an interior mouth 175 of outlet 22 and the portion of filter element 33 closest to the interior mouth of interior mouth 175. Deflector plate 170 is a static fluid directing device arranged to cause the fluid coming into the interior mouth 175 of the outlet 22 to be drawn from a plurality of directions predominantly perpendicular to the outlet 22. Without deflector plate 170, the fluid stream into the mouth of the outlet 22 may be drawn predominantly from fluid passing from pre-filtration zone 85 to filtration zone 40 through the portion of filter element 33 closest to the interior mouth 175 of outlet 22.

Deflector plate 170 is preferrably the same shape as interior mouth 175 and as large or larger than the interior mouth 175. In the preferred embodiment shown, deflector plate 170 is circular with a diameter about 1.5 times the diameter of mouth 175. Deflector plate 170 is secured to filter element 33 by any way known in the art, for example spot welding to flanged ends 35 and 36 or filter element guide rods 92. The dispersal and redirection of the incoming fluid stream, now drawn from a range of directions, rather than directly from the filter screen 33 immediately adjacent mouth 175, facilitates efficient generation of an entrained fluid stream. This entrained fluid stream draws from filtration zone 40 in multiple directions, and at an angle primarily perpendicular to the face of filter element 33, thus one does not generate a flow path which flows primarily through only one portion of the filter screen 33, namely that portion closest to mouth 175.

Figure 27:
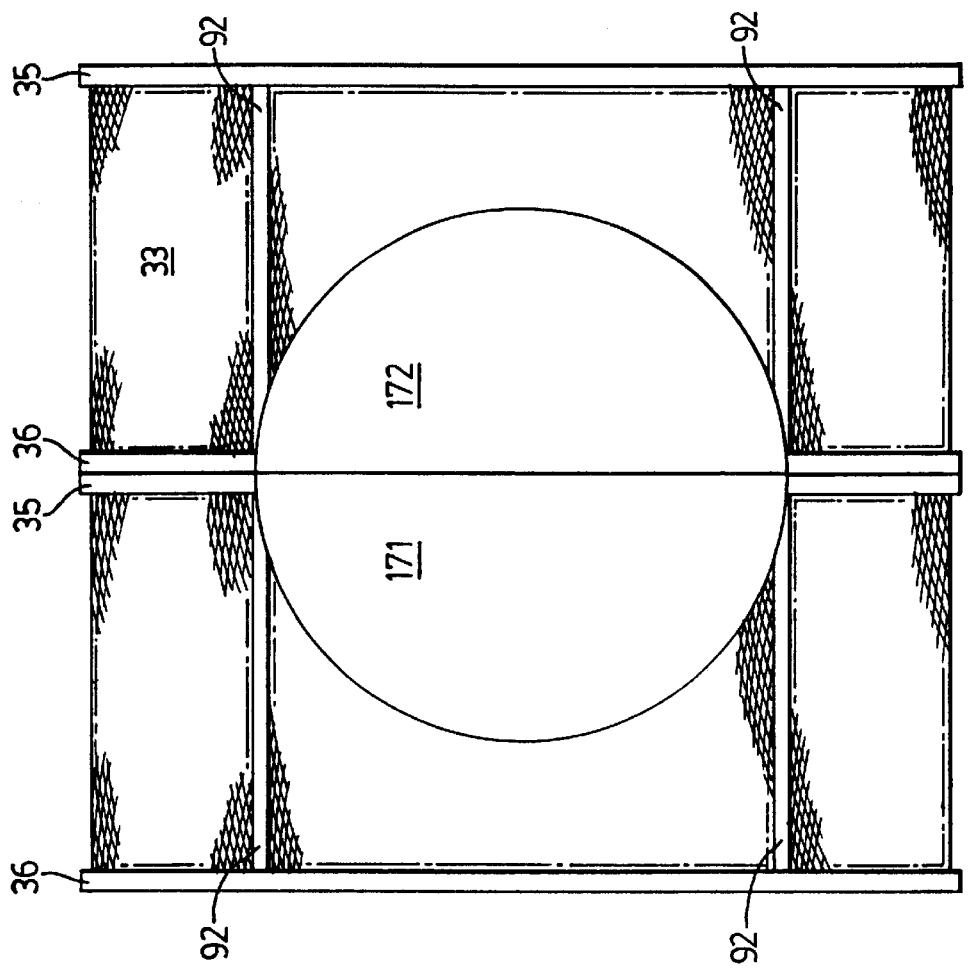
FIG. 27 is a top perspective view of an alternate embodiment of filter elements 33 of FIG. 10.

In another embodiment, shown in FIG. 27, the deflector plate comprises two plates 171 and 172. Deflector plate 171 is secured to a first filter element 33 while deflector plate 171 is secured to a second filter means 33, such that the deflector plates 171 and 172 align and form a circular plate when the first and second filter element are placed together in the liquid filtration device. This embodiment of deflector plate is used where the location of mouth 175 and the size of filter elements 33 of the liquid filtration device are such that, upon assembly, the flanged ends 35 and 36 of two filter elements meet along a line which corresponds to a line bisecting mouth 175. Thus, upon assembly, the deflector plates 171 and 172 join to form a deflector plate which is centered in relation to mouth 175.

The filter elements 33 are preferably of metal wire mesh type wherein a fine wire mesh defining a desired pore size is applied to a structural screen made of sheet metal (detail not shown). The structural screen acts as a support for the finer mesh. In a preferred embodiment, the structural screen consists of a rigid or semi-rigid plate having multiple apertures, and the mesh is fixed to the structural screen by a sintering process, such as the proprietary process performed by Purolator Products Company (Tulsa, Okla., USA). By use of this preferred embodiment, any damage to the fine mesh is restricted to the mesh at a given aperture of the structural screen, because the adjacent mesh is fixed to the structural plate. Isolated damage of this type may be easily repaired by simply soldering over a given structural screen aperture. Also, the use of this embodiment increases the ease with which the mesh may be cleaned, as compared to filter elements of the prior art. In a preferred embodiment, the mesh side of the filter element faces the pre-filtration zone. In an alternative embodiment the filter elements 33 are of a stainless steel wire mesh type in which a fine wire mesh defining a desired pore size is sandwiched between inner and outer structural screens also made of stainless steel. In another embodiment, the filter elements 33 comprise an outer structural screen, an inner filter mesh, and an intermediate structural screen sandwiched between the inner and outer layers.

By selecting the size of the openings in the filter element, the filter may be used, for example, to filter out zebra mussels, silt, algae, or other particulate matter. In a preferred embodiment, the mesh size is 40 microns or less. A mesh size of 40 microns allows the filter to remove zebra mussel larva. In the preferred embodiments described above, the filters are constructed with metal and stainless steel rings complete the flanged ends 35 and 36 of the filter element. However, those skilled in the art will appreciate that for other applications, materials as diverse as ceramics or poly vinyl chlorides may be used. Alternatively, electrostatic or ionic filters may be used for other applications.

In the preferred embodiments shown, the filter elements are cyclindrical, however, it will be appreciated that other dimensions may be used for the filter elements, so long as the filter element has an inner and outer face and ends having sealing surfaces capable of sealing in the manner described below.

Figure 7:
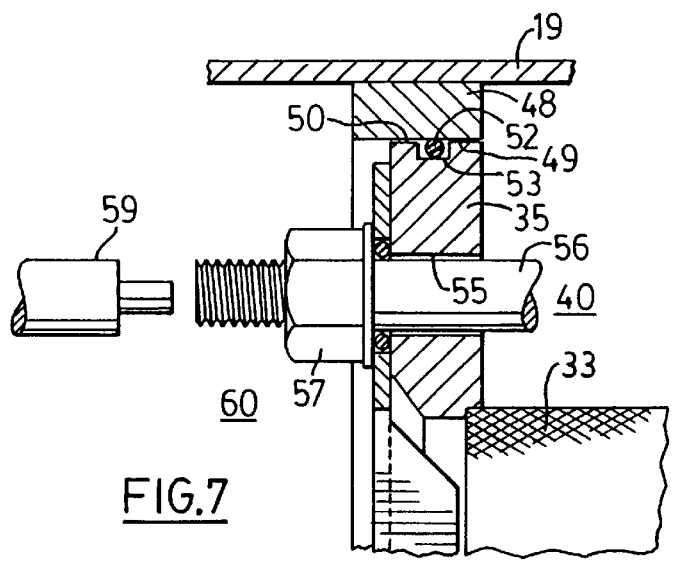
FIG. 7 is a detailed view taken at station 7 of FIG. 2.
Figure 8:
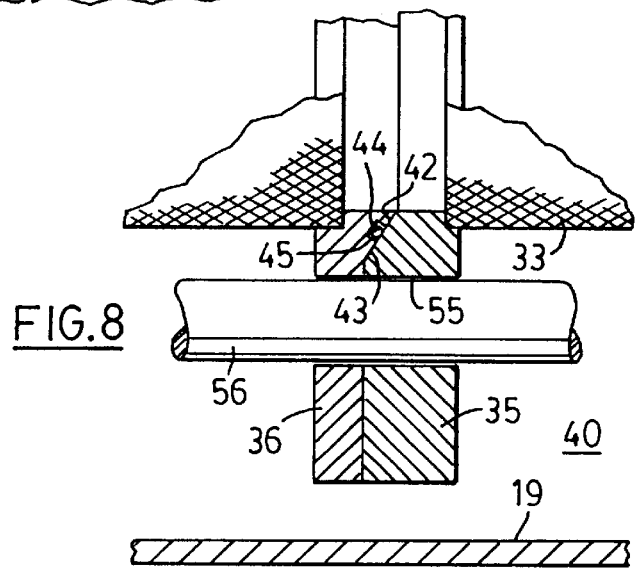
FIG. 8 is a detailed view taken at station 8 of FIG. 2.
Figure 9:
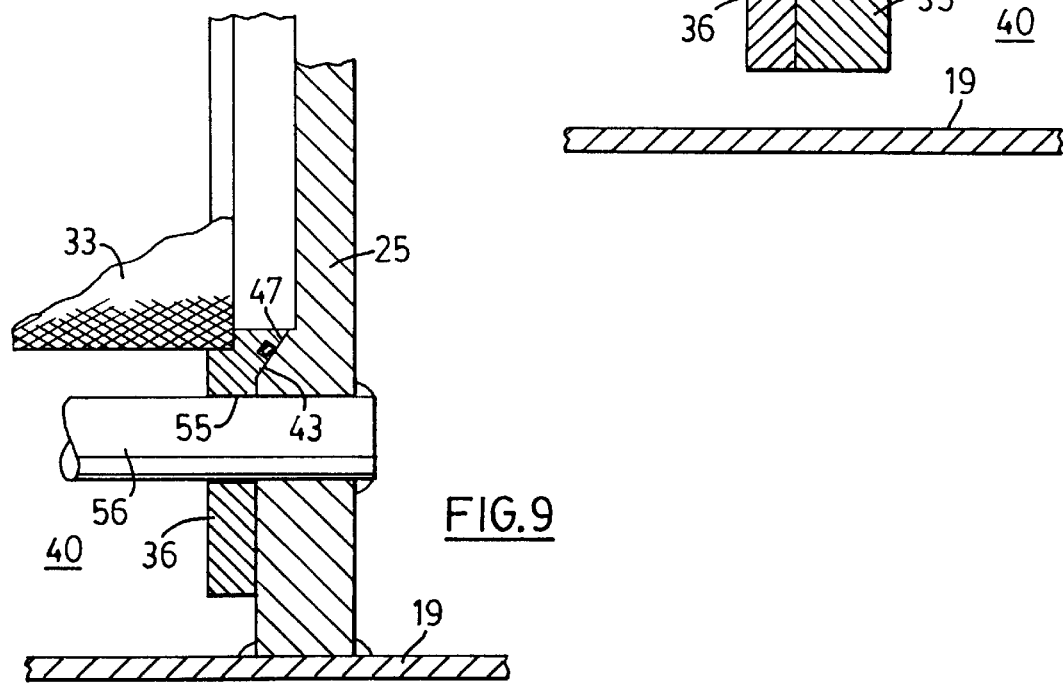
FIG. 9 is a detailed view taken at station 9 of FIG. 2.

As shown in FIG. 8, the flanged end 35 of filter element 33 has a chamfered surface 42 which abuts a mating surface 43 about the sealing surfaces of second flanged end 36 to provide a nesting engagement of two filter elements 33. The water seal between the abutting flanges 35 and 36 is assisted by the addition of a small cross sectional diameter O-ring 44 carried in a groove 45 formed in the surface 43. Likewise, as shown in FIG. 9, the partition 25 is provided with a chamfered partition seal surface 47 which aligns with and provides a sealing engagement with the mating surface 43 of a second flanged end 36. As shown in FIG. 7, a water seal is provided for the filtration zone 40 about the endmost first flanged end 35 of the filter element 33 positioned nearest the first end 14 of the housing 12 by a housing flange 48. Housing flange 48 has a sealing surface 49 which aligns with sealing surface 50 of endmost first flanged end 35. Housing flange 48 is fixed to the wall 19. An O-ring 52 is carried in a groove 53 formed in the surface 50 to provide a sealing engagement of the circumferential sealing surface 50 with the housing flange 48. These sealing arrangements thus are capable of forming a complete seal between filtration zone 40 and pre-filtration filtration zone 85.

The flanged ends 35 and 36 of the filter elements 33 have a plurality of holes 55 spaced around them for receiving filter guide rods 56. In most applications, four filter guide rods 56 are sufficient for the intended purpose. In the embodiments illustrated, the rods are cylindrical. However, it will be appreciated that the rods may be other dimensions, so long as they allow the filter elements to be installed or removed along the length of the rod. The filter guide rods 56 extend through and are fixed to the partition 25. The filter guide rods 56 are sized to extend just beyond the endmost first flanged end 35, and the filter guide rods 56 are threaded at their ends so that the filter elements 33 can be secured in place by nuts 57 (FIG. 7). Preferably, a precision machined threadless fastening nut is used. However, it will be appreciated that any suitable releasable fastening device known in the art may be used, for example threaded bolts or latch mechanisms. When installing and removing the filter elements 33 from the housing 12, filter guide rod extensions 59 may be added to the ends of the filter guide rods 56 by a precision machined threadless fastening coupling arrangement as shown in FIG. 7. These filter guide rods 56 provide a significant advantage over the prior art as they facilitate the proper positioning of the filter elements 33 within the housing 12, they ensure that the sealing surfaces of the filter elements 33 are aligned and mated properly, and by virtue of the tightening of the nuts 57 at the end of each filter guide rod 56, the filter elements 33 are compressed together to provide the necessary water seals to separate filtered water in the filtration zone 40 from unfiltered water in the prefiltration zone 85. The extensions 59 when attached to the filter guide rods 56 assist with the installation and removal of filter screens. Preferably, these extensions are long enough to exit the front of the filter housing 12.

Figure 12:
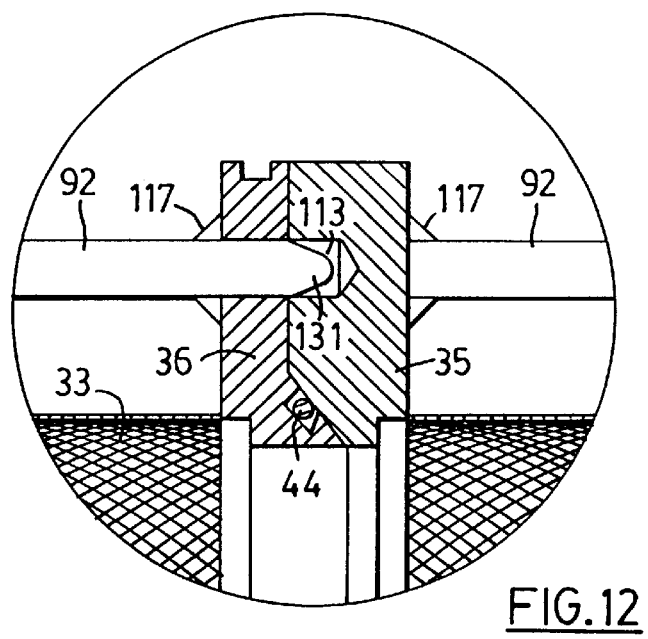
FIG. 12 is a detailed view taken at station 12 of FIG. 10.

In a preferred embodiment shown in FIG. 10, filter element guide rods 92 are used in place of filter guide rods 56. Filter element guide rod 92 extends between annular flanged ends 35 and 36 of filter element 33. Filter element guide rod 92 provides structural support to filter element 33, as well as a grip for manipulating filter element 33. As seen in FIG. 12, filter element guide rods 92 are fixed to flanged ends 35 and 36 by welds 117. A guide projection 131 of filter element guide rod 92 projects outwardly from flanged end 36. When the filter elements 33 are assembled, guide projection 131 is received by guide rod receptacle 113, thus aligning one filter element 33 with the next during assembly and reassembly.

In a preferred embodiment, the seals between the pre-filtration zone 85 and the filtration zone 40 can be tightened and secured by the structure shown in FIG. 11. As in the first embodiment, housing flange 48 extends circumferentially along the inner surface of housing wall 19, and is attached thereto by any method, for example, a weld 133. When all filter elements 33 are installed, the endmost first flanged end 35 is proximal to housing flange 48. Position pin 96 is held in position pin receptacle 114. Position pin 96 projects outwardly from endmost first flanged end 35 and is received by a support structure frame 105. A seal between endmost first flanged end 35 and support structure frame 105 is assisted by the addition of a small cross sectional diameter O-ring 135 carried in a groove 137 formed in the surface 139 of support structure frame 105. Pre-screen frame 101 is placed over support structure frame 105 and secured to housing flange 48 by means of pre-screen frame bolt 98. An O-ring 111 is carried in a groove 112 formed in the pre-screen frame 101 to provide a sealing engagement of the circumferential sealing surface 109 with the circumferential housing flange 48. An O-ring 52 is carried in a groove 53 formed in the support structure frame 105 to provide a sealing engagement of the support structure frame 105 with the pre-screen frame 101. These sealing arrangements thus form a seal between filtration zone 40 and pre-filtration zone 85 when frame bolt 103 is tightened. To ensure a tight and secure seal between flanged ends 35 and 36 seen in FIGS. 12 and 10, a jack screw 107 is received through pre-screen frame 101. When tightened, jack screw 107 applies force to support structure frame 105, and this force is transmitted to the flanged ends of each filter element 33 in the series.

Having regard to the above description, it will be appreciated that other functional equivalents of the sealing structure of FIG. 11 can be used. For example, the structure could be designed such that sealing surface 106 sealed with housing flange 48 rather than pre-screen frame 101. As another example, support structure frame 105 could be removed, support structure 75 could be incorporated into pre-screen frame 101, and flanged end 35 could align directly with pre-screen frame 101. In this embodiment, jack screw 107 could be received by position pin receptacle 114 to ensure alignment, or another position pin receptacle (not shown) on pre-screen frame 101 could be used to ensure alignment between pre-screen frame 101 and flanged end 35. However, it will be appreciated that use of the preferred embodiment, described above and shown in FIG. 11, accommodates a water tight seal even if circumferential housing flange 48 is not perfectly circular. The present inventors have found that, because housing flange 48 is welded to housing wall 19, flange 48 will not form a true circle if housing wall 19 is not perfectly cylindrical, if the welding process induces any distortion, or if the water loads during operation induce any distortion.

Figure 13:
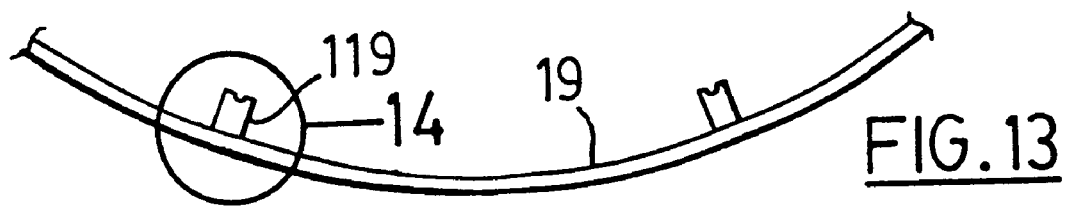
FIG. 13 is a cross sectional view of some features taken along line 13—13 of FIG. 10.
Figure 14:
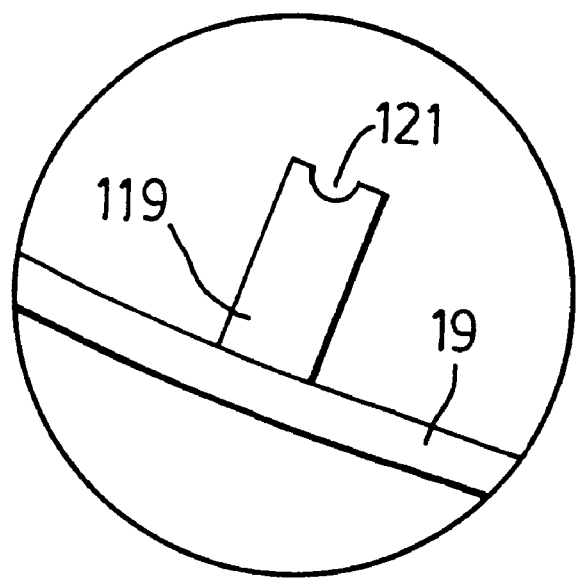
FIG. 14 is a detailed view taken at station 14 of FIG. 13.

The invention may further comprise a runner 119, shown in FIG. 13. Runner 119 preferably has a runner groove 121, which is suitable for receiving guide rod 92 of FIG. 10. Runner 119 facilitates the installation and removal of filter elements 33 by bearing some of the weight of the filter elements and by acting as a guide for aligning guide projection 131 with guide rod receptacle 113, thus assisting the installation, removal, and support of filter elements 33.

Figure 3:
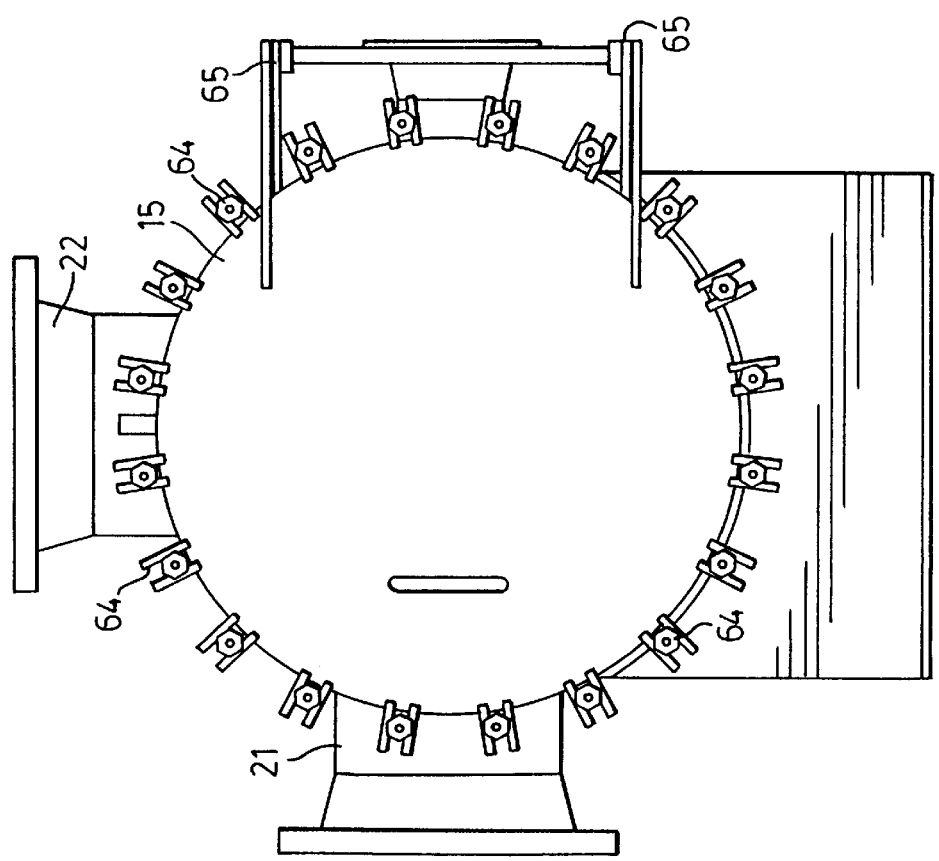
FIG. 3 is an end plan view taken along line 3—3 of FIG. 2.
Figure 6:
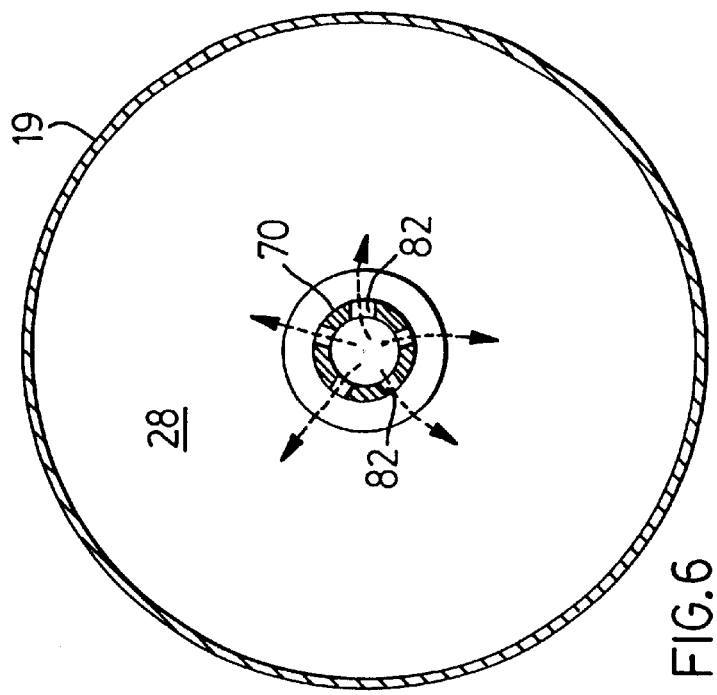
FIG. 6 is a cross sectional view taken along line 6—6 of FIG. 2.
Figure 5:
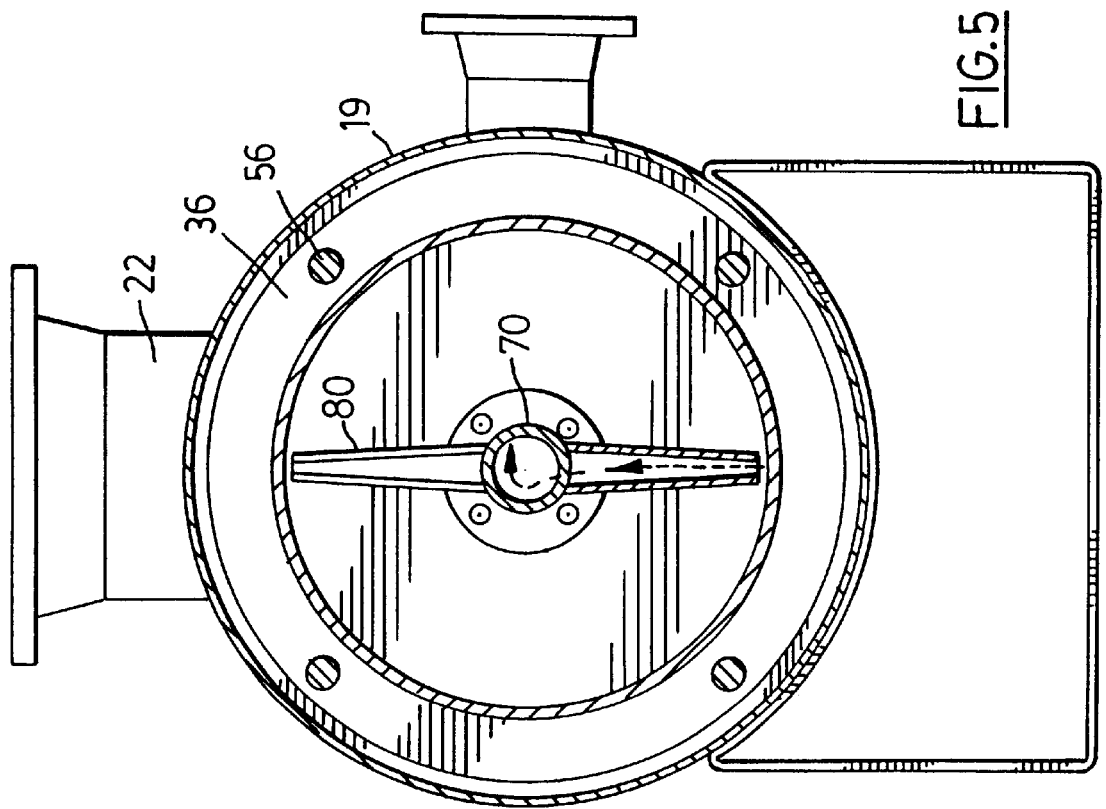
FIG. 5 is a cross sectional view taken along line 5—5 of FIG. 2.

Returning to FIGS. 1 and 2, an inlet zone 60 is defined within the housing 12 from the first end 14 to the first filter element 33. The inlet 21 extends through the wall 19 of the housing 12 into the inlet zone 60. The first end 14 has a flange 62 to which the door 15 seals with the aid of an O-ring and a plurality of swing bolts 64 spaced around the circumference of the flange 62. The door 15 has hinges 65 (best shown in FIG. 3) to swing completely away from the opening of the first end 14, thus allowing for ready access to the interior of the housing 12.

Thus, in use, as shown by the arrows in FIGS. 1 and 2, unfiltered water enters the filter housing 12 through the inlet 21, into the pre-filtration zone 85 where the pressure of the system forces a flow through the filter mesh of the filter elements 33 to provide a flow of filtered water into the filtration zone 40. The water passes perpendicularly through the filter element 33 and into filtration zone. From here filtered water passes from the filtration zone 40 through the outlet 22 and on to its intended purpose. After a period of use, the filter elements 33 will become partially clogged with particulate matter, and a pressure drop will occur at the outlet 22. In response to this problem, the invention can include a vacuum filter cleaning system.

As seen in FIG. 2, a hollow shaft 70 extends from the second end 17 of the housing 12 longitudinally through the center of the partition 25 and the filter elements 33. The shaft 70 has a first end 72 which is supported by a bearing 73 in a cross-shaped support structure 75 attached to the filter guide rods 56 by the nuts 57. Shaft 70 is closed at first end 72. The second end 76 of the shaft 70 is attached to a rotation device, such as a gear box 79, shown in FIG. 1. Gear box 79 is actuated by motor 77, both of which are located at the second end 17 of the housing 12. Gear box 79 may contain a device for selecting various gears relating to various rotational velocities of shaft 70. Alternately, gear box 79 can be designed with a preselected optimal gear ratio to achieve an optimal rotational velocity for shaft 70. The optimal velocity will depend on operating conditions of the system for which the filter is designed, for example, the flow rate required, the pressure differential between the prefiltration zone 85 and the discharge chamber 28, and the size and quantity of impurities flowing into the filter.

In another alternative, rather than using a motor, the filter could be designed to harness the power of the flow of the water through the system for use in rotating the shaft 70, for example, by fins secured, directly or indirectly, to said shaft 70.

The shaft 70 has a plurality of hollow filter cleaning heads 80 which extend radially outward from the shaft 70 to a position proximal to the inner surface of each filter element 33. A portion of the shaft 70 near its second end 76 in the discharge chamber 28 has a plurality of holes (only hole 82 shown in FIG. 2). Thus there is provided flow communication from the inner surfaces of the filter elements 33, through the cleaning heads 80, through the hollow shaft 70 to the discharge chamber 28.

Once the filtrate trapped on the filter element becomes dense enough to cause a predetermined drop in pressure, for example, 5 psi (350 kg/cm$^2$), the vacuum cycle may be initiated to remove the filtrate. When the vacuum cycle commences, the motor 77 starts to rotate the gears inside of gear box 79, and the gears rotate the shaft 70 inside of the filter elements 33. Motor 77 may be powered by any device known in the art, for example, electricity or water turbine.

The cleaning heads 80 on the shaft are located with apertures close to the inner face 31 of the filter elements. Since there is water pressure inside the filter body during normal operation, a suction pressure is created once the valve 30 is opened to the atmosphere. As seen by the arrows in FIGS. 1, 2, 5 and 6, the opening of the valve 30 to the atmosphere creates a suction which draws water through the holes 81, 82, 84 and a hole opposite hole 81 (not shown) in the shaft 70 (as shown in FIG. 15) which in turn provides a suction at the ends of the cleaning heads 80. By rotating the shaft 70 during the vacuum cycle, the cleaning heads 80 are able to remove entrapped particulate matter so that the filter elements 33 are returned to their former efficiency. While the frequency and duration of the vacuum cycle is adjustable to suit particular circumstances, in a preferred embodiment, the cycle is initiated when the pressure drops by about 5 psi at the outlet 22, and is maintained for 8–10 seconds. In other embodiments, the vacuum cycle could run continuously during filtration, so long as the rate of water flowing through the shaft 70 is less than the rate of water flowing through the inlet 21. In another embodiment, during the cleaning cycle the flow rate through the filter can be reduced or even eliminated, for example, by use of a valve (not shown) at inlet 21.

In the embodiment shown in FIG. 15, the cleaning heads are fin nozzle cleaning heads 123. The fin nozzle design increases the efficiency and effective force of the vacuum to better clean the filter elements. The fin nozzle design also decreases the outer surface area of the cleaning heads, thus decreasing the resistance to rotation encountered by the cleaning heads during rotation, thus requiring less energy to rotate the cleaning heads. Also in the embodiment shown in FIG. 15, the cleaning heads are offset such that the distribution of weight of the cleaning heads is distributed more evenly from the centerline of shaft 70.

Structural strength is added to nozzle cleaning heads 123 by joining cleaning heads 123 in pairs at two locations. First, cleaning heads 123 are joined in pairs at their distal ends, i.e., their intakes 120. Second, cleaning heads are joined in pairs by a support bar 124, which connects to cleaning heads 123 at a position approximately half way between their intakes 120 and the connector tubes 141, 142, 143 and 144.

Also in the embodiment shown in FIG. 15, the invention further comprises connector tubes 141, 142, 143 and 144 which are in flow communication between their corresponding cleaning heads 123 and the hollow of shaft 70. Connector tube 141 is the closest of the four connector tubes to first end 72 of shaft 70. Connector tube 142 is the second closest of the four connector tubes to first end 72 of shaft 70. Connector tube 143 is the third closest of the four connector tubes to first end 72 of shaft 70. Connector tube 144 is closest of the four connector tubes to second end 76 of shaft 70.

Stem 129 of cleaning head 123 adjustably inserts into connector tubes 141, 142, 143 and 144 to form a substantially water tight seal. Adjuster screw 127 is configured for adjusting the outward projection of cleaning head 123 from shaft 70. By adjusting adjuster screw 127, the intake 120 of cleaning head 123 can be positioned a preferred distance from inner face 31. The preferred clearance between inner face 31 and the intake 120 of cleaning head 123 will depend on the size of the impurities which are to be suctioned from filter element 33. This preferred clearance is often between 1/8th to 1/16th of an inch (1.59 mm to 3.17 mm).

In the preferred embodiment, shown in FIGS. 15–25, shaft 70 comprises four vacuum chambers 161, 162, 163, 164 within the shaft. Each of the four vacuum chambers is of a different length. Shaft 70 has a first vacuum chamber 161 which extends between and is in flow communication with connector tube 141 and hole 81. Second vacuum chamber 162 extends between and is in flow communication with connector tube 142 and hole 82. Third vacuum chamber 163 extends between and is in flow communication with connector tube 143 and a hole (not shown) opposite hole 81. Fourth vacuum chamber 164 extends between and is in flow communication with connector tube 144 and hole 84. By use of the separate vacuum chambers, the vacuum is more evenly distributed to each connector tube 141, 142, 143 and 144, and hence more evenly distributed to each stem 129 and cleaning head 123. Without separate vacuum chambers, vacuum in shaft 70 might be primarily draw from the closest cleaning heads—e.g. those extending from connector tubes 143 and 144—at the expense of decreased vacuum available to the cleaning heads extending from connector tubes 141 and 142.

Vacuum chambers 161, 162, 163 and 164 may be created by securing various plates and end walls within shaft 70, as follows.

As shown in FIGS. 15 and 17 to 25, a bisecting plate 151 extends lengthwise along the interior of shaft 70, from connector tube 141 to second end 76 of shaft 70, bisecting the interior of the shaft. As shown in FIG. 17, a first end wall 181 seals the end of vacuum chamber 161 which is proximal to first end 72 of shaft 70 such that a portion of the interior of the bisected shaft 70 is in flow communication with connector tube 141 and hole 81 to form first vacuum chamber 161.

As shown in FIGS. 15 and 19 to 25, a first quartering plate 153 extends lengthwise within shaft 70, from connector tube 142 to second end 76 of shaft 70, bisecting the interior of vacuum chamber 161 along that length, to divide out second vacuum chamber 162 from first vacuum chamber 161 which continues along the interior of shaft 70, reduced in cross-sectional area by half. As shown in FIG. 19, a second end wall 182 seals the end of vacuum chamber 162 which is proximal to first end 72 of shaft 70 such that a dedicated portion of the interior of the shaft 70 is in flow communication with connector tube 142 and hole 82 to form second vacuum chamber 162.

As shown in FIGS. 15 and 21 to 25, a third end wall 183 seals the end of vacuum chamber 163 at connector tube 143 such that the interior of the shaft 70 is in flow communication with connector tube 143 and a hole (not shown) opposite hole 81 to form third vacuum chamber 163.

Figure 25:
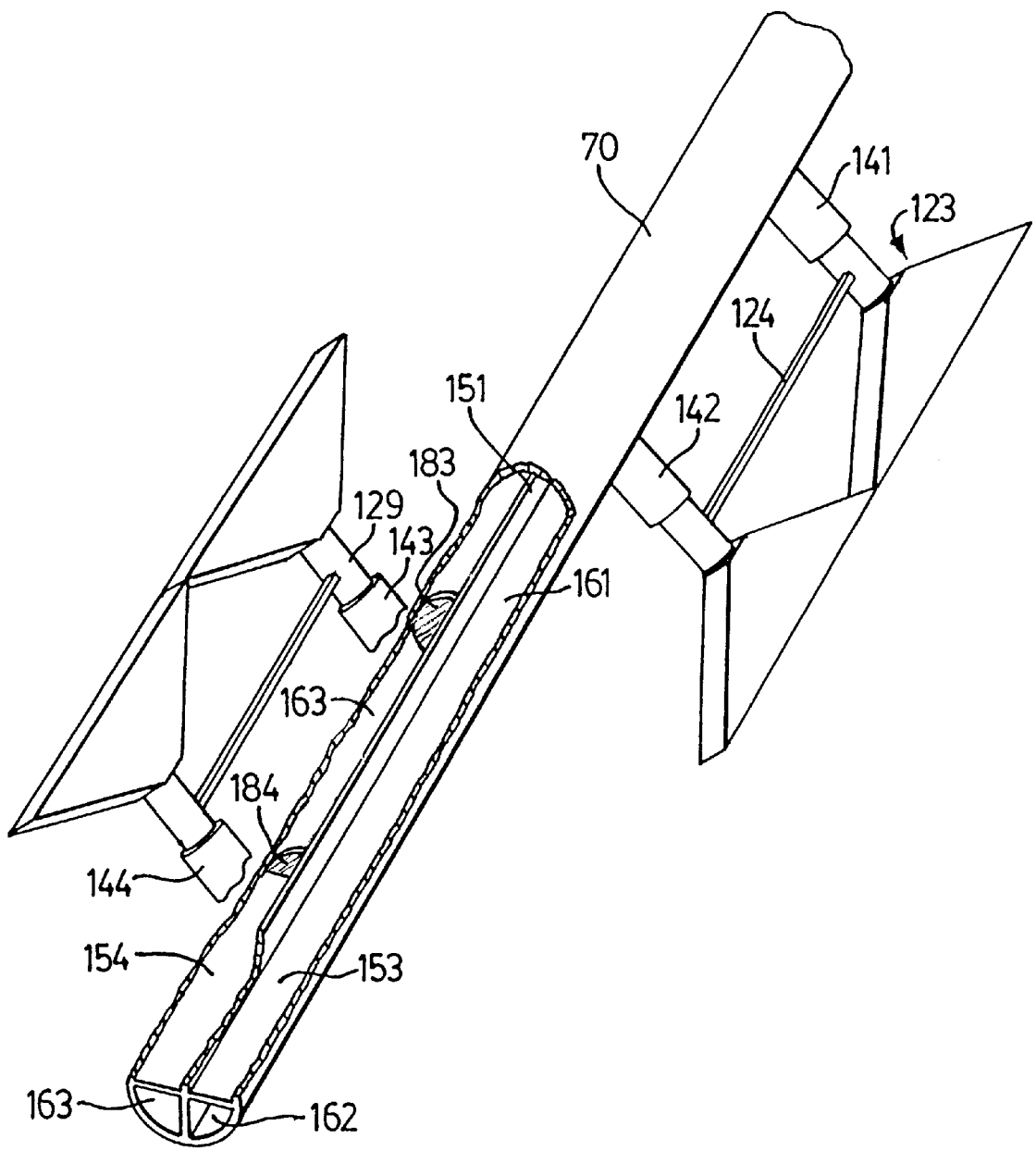
FIG. 25 is a perspective partially broken away view of a preferred embodiment of hollow shaft 70 of FIG. 15.

As shown in FIGS. 15 and 23 to 25, a second quartering plate 154 extends lengthwise within shaft 70, from connector tube 144 to second end 76 of shaft 70, bisecting the interior of vacuum chamber 163 along that length, to divide out fourth vacuum chamber 164 such that third vacuum chamber 163 continues along the interior of shaft 70, reduced in cross-sectional area by half. As shown in FIGS. 23 and 25, a fourth end wall 184 seals the end of vacuum chamber 164 which is proximal to first end 72 of shaft 70. The interior of the shaft 70 is thus in flow communication with connector tube 144 and hole 84 to form fourth vacuum chamber 164.

Because shaft 70 is closed at first end 72, the interior of shaft 70 which does not comprise one of vacuum chambers 161, 162, 163 or 164 remains essentially water-tight and free from water. This avoids the creation of a "dead zone" within the shaft 70 which contains water not subjected to flow. By avoiding such a "dead zone" the likelihood of buildup of debris or organic growth, such as zebra mussels, is decreased.

As shown in FIG. 15, holes 81, 82, and 84 (and one other hole not shown; located opposite hole 81 on shaft 70) are positioned such that the holes collectively do not significantly compromise the structural strength of end 76 of shaft 70. In order to maximize the distance between the four holes, and hence maximize the area of structural shaft 70 between each hole, each of the holes are staggered 90 degrees rotationally around shaft 70, and holes 81 and the hole not shown are staggered lengthwise on shaft 70 in relation to holes 82 and 84.

From the foregoing it will be appreciated that the present invention provides a number of advantages over prior devices. Stainless steel wire mesh filter units are expensive components, particularly those large units required for high throughput devices. Previously, filter units have been designed to serve a particular purpose, and thus, one design has usually been found not to be suitable for either scaled up or scaled down applications. In contrast, the present invention provides a combination of components which can readily be sized and configured to serve a wide variety of applications. The present invention is a modular system which allows the use of a plurality of smaller filter units which are nested together using metal to metal water seals. The releasable securing mechanism for the filter elements of the present invention is particularly useful in that it allows for a plurality of filter elements of a smaller size, as opposed to a single filter element of a larger size to be used. This facilitates construction, maintenance, removal and replacement of the filter elements. These filter units are lighter and easier to manufacture, hence, cheaper than larger units. Because they are smaller and lighter, the filter units of the invention are easy to install and remove.

The guide rods of the present device ensure an accurate alignment of the filter units and provide the structures for ensuring that the filter elements and their respective seals are aligned and centered properly, and to generally assist in securing them in place. These rods allow the design of the invention to be scaled up to handle very large flows. The rods, together with the use of the sealing surfaces and the support structure enable one to compress the filter elements together to form the proper sealing required for the function of the filter. Also, the use of the cross shaped support structure 75 allows the shaft 70 to be centered and solidly supported.

The large water-tight door at one end of the present device allows a worker to more readily observe the filter operation, including the rotation of the shaft, while the device is empty of water, thus enabling a quicker determination of a malfunction than is possible with prior devices. Removal and replacement of the filter elements is likewise facilitated by the use of the door.

Removal and replacement of the filter elements are further facilitated by the sealing mechanism of the present invention. Whereas the prior art teaches methods of sealing using, for example, a lower O-ring in conjunction with a locking slit, the use of the sealing surfaces of the present invention, in conjunction with the compression from the rods allows for removal and replacement of filter elements without rotating or otherwise unlocking the filter elements. This allows for the handling of larger filter elements than would be practical with conventional methods of sealing in the art.

Thus there are several aspects of the present invention that counter size and mass concerns of industrial filters. The present invention is particularly suited to industrial uses requiring high throughput, large volume filters. The sealing mechanism of the present invention has been found to be useful for filters where the pressure differential from one side of the filter element must be kept at a low level, for example, less than approximately 5 psi (350 kg/cm$^2$), in order to maintain the required flow of water.

The present invention also provides a low maintenance filter system, thus increasing cost efficiency. By employing a minimum of moving parts, and by providing for a self-cleaning system, the filters of the invention can operate for months, and possibly years without requiring maintenance apart from standard maintenance for the movement means, which is conveniently located outside the filter housing. Unlike self-cleaning filters of the prior art, motor or gearbox maintenance may be readily performed without opening or draining the filter housing.

The filter of the present invention may be particularly suited for water intake ports, such as those found at power plants. The filter of the present invention is also useful for other applications, for example, in the food industry, pulp and paper industry, and for fish hatcheries. The filter is also useful for non-water applications, for example, for filtering machine cuttings out of an oil emulsion.

Although preferred embodiments of the invention have been disclosed for illustrative purposes, it will be appreciated that variations or modifications of the disclosed apparatus lie within the scope of the present embodiments.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

We claim:

1. A filter for filtering liquids comprising a housing having an inlet, an outlet and an inner surface, said filter comprising:
   (i) at least one removable filter element having an inner face, an outer face and first and second outwardly flanged ends, each of the outwardly flanged ends having a sealing face;
   (ii) a first sealing face on the inner surface of the housing, said sealing face of the inner surface of the housing being sealable with said sealing face of the second outwardly flanged end;
   (iii) a housing flange on the inner surface of the housing, said housing flange having a second sealing face adjacent to said sealing face of the first outwardly flanged end;
   (iv) a frame releasably secured to said housing flange; and
   (v) a jack device located on said frame and arranged for applying force to said filter element,
   wherein, upon the application of force from the jack device, said sealing faces are sealed to define a liquid flowpath through said inlet, through said inner face of said filter element to said outer face of said filter element and out said outlet.

2. The filter as claimed in claim 1, further comprising a position pin and position pin receptacles located in both said first flanged end and said frame, said position pin receptacles configured for receiving said position pin.

3. The filter as claimed in claim 1, further comprising;
   a support structure located between said first flanged end and said frame;
   a position pin; and
   position pin receptacles located in both said first flanged end and said support structure; said position pin receptacles aligned for receiving said position pin;
   wherein said jack device applies force to said filter element through applying force to said support structure.

4. The filter as claimed in claim 1, further comprising:
   a third sealing face located on said support structure, and fourth and fifth sealing faces located on said frame,
   wherein, when said jack device applies force, said sealing face of the support structure seals with said fourth sealing face on the frame seals with said sealing face of the housing flange.

5. The filter as claimed in claim 1, wherein a flange of said flanged ends projects from a side of the filter element corresponding to said outer face of said filter element.

6. The filter as claimed in claim 1, wherein said filter further comprises one or more additional filter elements connected in series to said at least one removable filter element along a lengthwise direction, each of the filter elements sealable with an adjacent one of the filter elements.

7. The filter as claimed in claim 1, wherein said sealing faces are chamfered.

8. The filter as claimed in claim 1, wherein said filter further comprises a door arranged on said housing and configured for accessing said at least one filter element and said at least one filter element is removable and replaceable through said door.

9. The filter as claimed in claim 8, wherein said door is hinged.

10. The filter as claimed in claim 1, wherein said filter element is cylindrical.

11. The filter as claimed in claim 1, wherein the flowpath through said filter is perpendicular to said inner face.

12. The filter as claimed in claim 1, wherein said filter element comprises a structural screen and a mesh screen, said structural screen comprising a rigid or semi-rigid plate having multiple apertures, and said mesh is fixed to the structural screen by a sintering process.

13. The filter as claimed in claim 12, wherein said mesh screen is said inner face and said structural screen is said outer face.

14. The filter as claimed in claim 12, wherein said mesh screen has a mesh size of 30 to 40 microns.

15. The filter as claimed in claim 1, further comprising a pre-screen positioned in the flowpath between said inlet and said filter element, and a pre-screen drain positioned in the flowpath between said pre-screen and said inlet.

16. The filter as claimed in claim 1, further comprising a cleaning member arranged for cleaning said inner face of the filter element, the cleaning member having:
   a cleaning head positioned adjacent to said inner face;
   a stem in flow communication from said cleaning head to a conduit;
   a discharge aperture extending through said housing;
   said conduit in flow communication from said stem to the discharge aperture; and
   a vacuum device connected in fluid communication with the conduit so as to provide suction to said conduit and the cleaning head to suction material from the inner face of said filter element, through the conduit and out the discharge aperture.

17. The filter as claimed in claim 16, wherein said filter further comprises a movement device connected to said cleaning member, said movement device arranged to move said cleaning head parallel to said inner face of said filter element.

18. The filter as claimed in claim 17, wherein said filter element is cylindrical and said cleaning member moves rotationally.

19. The filter as claimed in claim 16, wherein said cleaning head does not contact said inner face.

20. The filter as claimed in claim 16, wherein said housing further comprises a partition to prevent the flow of fluid between a discharge portion of the filter which includes said discharge aperture and a filter portion of said filter which includes said filter element, and said conduit passes through said partition.

21. The filter as claimed in claim 17, wherein said cleaning member passes through said housing and said movement device is located outside of said housing.

22. The filter as claimed in claim 17, wherein said cleaning member further comprises a plurality of cleaning heads in communication with said conduit, said cleaning heads positioned along said cleaning member such that substantially all of said inner face is subjected to vacuum from said cleaning heads when said movement device is operated.

23. The filter as claimed in claim 16, wherein said cleaning head is a triangular fin nozzle.

24. The filter as claimed in claim 16, further comprising a support structure located on said frame, and said support structure supports said conduit.

25. A filter for filtering liquids comprising a housing having an inlet, an outlet and an inner surface, said filter comprising:
   (i) at least one removable filter element having an inner face, an outer face and first and second flanged ends, each of the flanged ends having a sealing face and a rod aperture, and said rod apertures of said first and second ends aligned in a lengthwise direction;
   (ii) a housing flange on said inner surface of the housing, said housing flange being sealable with said sealing face of the first flanged end of the filter element;
   (iii) a first sealing face on said inner surface of the housing, said first sealing face being sealable with said sealing face of the second flanged end of the filter element;
   (iv) at least one rod extending in a lengthwise direction through said rod apertures, said rod having a first rod end, said rod configured for releasably securing said filter element and a second rod end secured to said housing;
   (v) a fastening device configured for securing the first rod end, wherein, upon securing said fastening device, sufficient force is applied to said sealing faces to define a liquid flowpath through said inlet, through said inner face of said filter element to said outer face of said filter element and out said outlet;
   (vi) a door on said housing arranged for accessing said at least one filter element; and
   (vii) removable extensions configured for extending the length of the at least one rod to said door.

26. The filter as claimed in claim 25, wherein said filter further comprises a plurality of rod apertures at said first and second flanged ends and a plurality of rods extending therethrough.

* * * * *